US006631434B1

(12) United States Patent
Johnson et al.

(10) Patent No.: US 6,631,434 B1
(45) Date of Patent: Oct. 7, 2003

(54) DYNAMIC EARLY INDICATION SYSTEM FOR A COMPUTER

(75) Inventors: Scott C. Johnson, Williamson County, TX (US); Rodney S. Canion, Travis County, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/440,396

(22) Filed: Nov. 15, 1999

(51) Int. Cl.[7] ............................. G06F 9/48; G06F 13/24
(52) U.S. Cl. ........................................ 710/260; 710/266
(58) Field of Search ................................ 710/260, 266, 710/309, 300; 709/250, 237, 253, 301; 711/111, 112, 154, 167; 713/500; 340/501

(56) References Cited

U.S. PATENT DOCUMENTS

| 4,387,365 A | 6/1983 | Berry et al. ................ 364/731 |
| 4,785,448 A | 11/1988 | Reichert et al. ............... 370/76 |
| 5,307,459 A | * 4/1994 | Petersen et al. |
| 5,319,752 A | * 6/1994 | Petersen et al. |
| 5,566,321 A | 10/1996 | Pase et al. ................... 711/153 |
| 5,649,127 A | 7/1997 | Hang ........................... 395/307 |
| 5,668,968 A | 9/1997 | Wu ................................ 711/3 |
| 5,717,876 A | 2/1998 | Robertson .................... 395/309 |

* cited by examiner

*Primary Examiner*—Gopal C. Ray

(57) ABSTRACT

A dynamic early indication system for a computer includes a processor subsystem logic that performs a subsystem function, an early indicator, indication logic, and a driver that is executed by the processor in response to an indication to perform processing. The indication logic may be coupled to the subsystem logic and early indicator to provide an indication that informs the processor when processing associated with the subsystem function is needed at a completion time of the subsystem function. The indication may be provided before the completion time of the subsystem function if the early indicator represents early indication. The driver controls the early indicator to improve efficiency of subsystem processing.

48 Claims, 9 Drawing Sheets

DYNAMIC EARLY INDICATION SYSTEM FOR A COMPUTER

FIELD OF THE INVENTION

The present invention relates to a method and apparatus for providing dynamic early indications for a computer subsystem function that informs a processor to perform associated processing.

DESCRIPTION OF THE RELATED ART

Computers typically include several subsystems that perform one or more predetermined or desired functions, such as functions associated with data transfer, communications, data processing, etc. It is often desired to inform a processor or central processing unit (CPU) of the computer to perform processing associated with one or more of the subsystem functions. In this manner, the subsystem cooperates with the CPU by completing a task or operation and informing the CPU of the completed task so that the CPU may perform further processing. For example, an expansion or adapter card may be plugged into a peripheral bus of a computer that transfers data to the main memory of the computer. The expansion card sends an interrupt to the CPU after the data is transferred, so that the CPU may execute an interrupt handling routine to process the data.

Significant delay may occur between the time the interrupt is asserted until the CPU begins the associated processing in response to the interrupt. Such delays may arise from several sources, such as from bus and logic latency while transferring the interrupt to interrupt handling logic, and/or from the CPU completing a current task and executing an interrupt service routine (ISR) or driver associated with the particular type of interrupt. Such delays cause inefficiency of the subsystem, which may affect the overall performance of the computer system.

One exemplary subsystem is network communications such as performed by a network adapter card or network interface controller (NIC). Computers and other devices may be networked together using any one of several available architectures and any one of several corresponding and compatible network protocols. A common network architecture is Ethernet™, such as the 10Base-T Standard operating at 10 Megabits per second (Mbps) and 100Base-TX Ethernet™ Standard operating at 100 Mbps according to the IEEE Standard 802.3. A newer Ethernet™ architecture operating at 1 Gigabit per second (Gbps) is available and becoming more prominent for server systems. The present invention is illustrated using the Ethernet™ architecture and TCP/IP (Transmission Control Protocol/Internet Protocol), which is a common network protocol particularly for the Internet. The present invention, however, is not limited to any particular network protocol or architecture. In fact, although the present invention is illustrated using network type communication systems, it is not limited to network communications and may be applied to any type of subsystem of a computer.

A computer typically includes a bus system with corresponding slots for receiving compatible network adapter expansion cards, such as NICs, for interfacing the computer to a network. Each NIC includes an appropriate connector for interfacing a compatible network cable, such as a coaxial cable, a twisted-wire cable, a fiber optic cable, etc. For example, in an Ethernet™ star configuration, each NIC includes an RJ-45 connector for receiving a compatible RJ-45 plug of a twisted-wire cable, where each network cable is coupled to a central device such as a repeater, hub, switch, etc. The bus system may include one or more of several standard or proprietary buses, such as the Peripheral Component Interconnect (PCI), the Industry Standard Architecture (ISA) bus, the Extended ISA (EISA) bus, the Micro-Channel Architecture (MCA) bus, etc., as well as a host bus and an input/output (I/O) extension bus, sometimes called the "X-bus". The NIC also includes a compatible connector to plug into a corresponding bus of the host computer system. For example, A PCI compatible NIC including a PCI connector is common for servers.

The primary function of the NIC is to transfer data to and from system memory of the computer system, although the NIC may perform many other network functions. A NIC may have its own processor or processing logic, but many network functions may still require processing by the main processor or central processing unit (CPU) of the host computer system. For example, a NIC often includes Direct Memory Access (DMA) circuitry or the like for transferring data between the NIC and the system memory. After transferring data from the network to the computer system memory, however, the computer CPU may be needed to process the transferred data in the system memory. In a similar manner, when data is transferred from the system memory to the NIC or asserted onto the network, the NIC may inform the CPU that the transfer has completed so that the CPU may perform associated functions or processing.

The NIC asserts an indication or interrupt to inform the host CPU that processing by the CPU associated with a network function is necessary. A certain amount of interrupt latency exists between when the interrupt is asserted and when the host CPU executes a driver associated with the NIC in response to the interrupt to handle network associated processing. The interrupt latency is caused by several factors, such as delay caused by the computer bus system when transferring the interrupt to the appropriate interrupt handling circuitry of the computer. The host CPU may cause further interrupt delays, since it typically must complete any current processing and usually must locate and execute the NIC driver to handle the interrupt.

One or more computers in a network configuration may operate as servers for other computers and devices in the network. Often, the other computers and devices rely on the server(s) for information, storage, access to databases, programs, other networks, etc., and various other services. It is desired to improve network processing between a network adapter or NIC and its host computer for any computer coupled to a network. This is particularly true when the computer operates as a server on the network. It is desired that each server operate as efficiently as possible and to provide as much data bandwidth as possible, especially during periods of heavy demand and increased network traffic. More generally, it is desired to improve the efficiency of processing associated with any type of subsystem of a computer.

SUMMARY OF THE INVENTION

A dynamic early indication system according to the present invention includes a processor, subsystem logic that performs a subsystem function to be reported to the processor, an early indicator, indication logic that provides an indication to inform the processor that processing associated with the subsystem function is needed at a completion time of the subsystem function, and a driver that is executed by the processor in the response to the indication to perform the subsystem processing. The indication logic provides the indication prior to the completion time of the subsystem function if the early indicator indicates early indication. Also, the driver, when executed by the processor, controls the early indicator in an attempt to improve efficiency of the subsystem processing.

In one embodiment, a memory is included and coupled to the processor, where the subsystem function is associated with transferring data between the network and the memory of the computer system. In this case, the completion time corresponds to when data has been completely stored in the memory. The indication logic calculates or otherwise estimates the completion time using a known or otherwise determined data transfer rate and the amount of data to be transferred and calculates an early time using the calculated completion time and a predetermined early time offset. In this manner, the indication logic provides the indication at the early time if so indicated by the early indicator, such as before the completion time by an amount of time corresponding to the predetermined early time offset.

The early indicator may be an early logic bit that determines whether early indication is to be used. For example, if the early bit is set, then the indication logic provides the indication before the completion time of the subsystem function. Otherwise, if the early bit is cleared, the indication logic provides the indication when it is determined that the subsystem function has been completed. In one embodiment, the computer is coupled to a network and the subsystem logic comprised network logic. In that case, the driver may include monitoring logic that monitors network traffic and sets the early logic bit during relatively low network traffic. The driver also clears the early logic bit during relatively high network traffic to effectively turn off early indication. In this manner, the driver determines whether early indication is used or not by setting the early logic bit, where the decision is based upon the relative traffic of the network.

In another embodiment, the early indicator is a programmable early time offset. In this case, the indication logic estimates the completion time of the subsystem function and provides the indication at a time based on the estimated completion time and the early time offset. For example, the indication may provide the indication at an early time by subtracting the early time offset from the estimated completion time to provide the indication early. The driver, when executed, may determine a difference time between an actual completion time of the subsystem function and a response time of the driver and accordingly adjust the early time offset in an attempt to reduce subsequent difference times. For example, if the driver is executed too early so that the subsystem function has not completed, then the driver may increase the early time offset so that next time the driver will not be executed too early. If the driver is executed too late or after the subsystem function has completed, then the driver may decrease the early time offset in an attempt to cause the execution of the driver on time.

In embodiments where the early indicator comprises a programmable early time offset, it may require substantial additional logic for the driver to determine the difference time between its execution and the actual completion time of the network function. To eliminate the need for such additional logic, the driver may simply determine whether the subsystem function has been completed and accordingly adjust the early time offset by an incremental amount. In this manner, the early time offset will close in on a maximal efficient value after several iterations of the executed driver. For network embodiments in which the computer is coupled to a network, the size of the incremental amount may depend upon the relative speed of the network. For example, the incremental amount may be several microseconds for a 100 Mbps embodiment or one or two microseconds for a 100 Mbps embodiment or a hundred or so nanoseconds for a one Gigabit per second (Gbps) embodiment.

In yet another embodiment, a timer is provided that is initiated when the indication is provided. The driver reads the timer when executed in response to the indication. In this manner, the timer includes a timing value or count value that represents elapsed time from when the indication is provided to when the driver is executed in response to the indication. For network embodiments, the elapsed time may represent an indication latency that may be used by a network administrator to adjust network operating parameters to improve efficiency. Alternatively, if the early indicator is a programmable early time offset, the driver may adjust the early time offset using the latency value read from the timer.

A computer system according to other embodiments of the present invention includes at least one peripheral bus, a disk drive and corresponding disk drive controller, a processor, a system memory, an expansion card coupled to the peripheral bus including subsystem logic that performs a predetermined function, and a subsystem driver that is executed by the processor from system memory in response to an interrupt from the subsystem card to perform subsystem processing associated with the predetermined function. The expansion card includes the subsystem logic, an early indicator that indicates an early interrupt mode of operation and interrupt logic that asserts the interrupt to inform the processor that subsystem processing associated with the subsystem function is needed at its completion time. The subsystem driver, when executed by the processor, controls the early indicator in an attempt to improve efficiency of subsequent processing associated with the predetermined function.

In a more specific embodiment, the computer system includes at least one peripheral bus, a disk drive and corresponding disk drive controller, a processor, a system memory, a network interface card (NIC) coupled to the peripheral bus including network logic that performs a network function, and a NIC driver that is executed by the processor from system memory in response to a network interrupt from the NIC to perform network processing associated with the network function. The NIC also includes an early indicator that indicates an early interrupt mode of operation and interrupt logic that asserts the network interrupt to inform the processor that network processing associated with the network function is needed at a completion time of the network function. The NIC driver, when executed by the processor, controls the early indicator in an attempt to improve efficiency of network processing.

In other embodiments, the completion time corresponds to when a group of data from the NIC is completely transferred to and stored in the system memory. The interrupt logic may further include timing logic that calculates the completion time based on the data transfer rate from the NIC to the system memory and an amount of data to be transferred. The timing logic calculates an early interrupt time using the calculated completion time and a predetermined early time offset. The interrupt logic asserts the network interrupt at the early interrupt time if the early indicator indicates the early interrupt mode of operation.

The early indicator may be an early logic bit that indicates the early interrupt mode when set. In one embodiment, the subsystem logic performs a predetermined function associated with data communication. The subsystem driver includes monitor logic that monitors data communication of the subsystem logic, where the subsystem driver sets the early logic bit during relatively low communication traffic and clears the early logic bit during relatively high communication traffic. For a network embodiment, the NIC driver may include monitor logic that monitors network traffic, where the NIC driver sets the early logic bit during relatively low network traffic and clears the early logic bit during relatively high network traffic.

Alternatively, the early indicator is a programmable early time offset. The interrupt logic includes timing logic that calculates a completion time and that determines an early interrupt time based on the difference between the calculated completion time and the early time offset. The subsystem driver may further include timing logic that determines a difference time between actual completion time of the subsystem function and a response time of the subsystem driver when executed by the processor. The subsystem driver may include interrupt logic that adjusts the early time offset in an attempt to reduce subsequent difference times.

In yet another embodiment, the subsystem driver interrupt logic, when executed, simply determines whether the subsystem function is completed and adjusts the early time offset by a predetermined incremental amount. The embodiment of adjusting the early time offset by an incremental amount allows for a simpler and more efficient design.

In another embodiment, the expansion card includes a counter that is started when the interrupt is asserted. The subsystem driver includes interrupt logic that reads a count value from the counter when the subsystem driver is executed in response to the interrupt. The count value read from the counter may be used to adjust the early indicator if it comprises a programmable early time offset.

A network controller system according to the present invention, for a computer coupled to a network, includes a processor, network logic that performs a network function, an early indicator, indication logic that provides an indication to inform the processor that network processing associated with the network function is needed at a completion time of the network function, and a driver that is executed by the processor in the response to the indication to perform the network processing. The indication logic provides the indication prior to the completion time of the network function if the early indicator indicates early indication. Also, the driver, when executed by the processor, controls the early indicator in an attempt to improve efficiency of the network processing.

A method of providing dynamic early indications for a subsystem of a computer includes providing an early value indicative of early interrupt mode of operation, initiating a subsystem function and providing an indication to request processing associated with the subsystem function. The indication is provided before the subsystem function is completed if the early value indicates the early interrupt mode of operation. The method further includes executing a driver to perform the processing associated with the subsystem function in response to the indication, where the executing driver controls the early value in an attempt improve efficiency of processing associated with the subsystem function.

A method of providing early indications for a computer coupled to a network includes providing an early value indicative of early indication mode of operation, initiating a network function and providing an indication to request network processing associated with the network function. The indication is provided before the network function is completed if the early value indicates the early indication mode of operation. The method further includes executing a driver to perform the network processing associated with the network function in response to the indication, where the executing driver controls the early value in an attempt improve efficiency of network processing.

The subsystem function may be any one or more of many possible functions, such as transferring data to a memory of the computer. For data transfer to the computer, the method further includes calculating an estimated completion time of when data is completely transferred to the memory, calculating an early time using the estimated completion time in a predetermined early time offset, and providing the indication at the early time if the early value indicates the early indication mode of operation.

The subsystem function may be associated with data communication and the early value may comprise an early logic bit, where the method includes monitoring communication data flow, setting the early logic bit during relatively low data flow, and clearing the early logic bit during relatively high data flow. For network embodiments in which the computer is coupled to a network, the method may include monitoring traffic on the network, setting the early logic bit during relatively low network traffic and clearing the early logic bit during relatively high. network traffic.

Alternatively, the early value comprises a programmable early time offset, where the method includes calculating an estimated completion time of the subsystem function and providing the indication before the subsystem function is completed using the estimated completion time and the early time offset. The method may further include determining a difference time between an actual completion time of the subsystem function and when the driver is executed to perform the processing associated with the subsystem function and adjusting the early time offset in an attempt to reduce subsequent difference times. Alternatively, the method comprises determining whether the subsystem function is completed when the driver is executed and adjusting the early time offset by an incremental amount. For example, the early time offset may be decreased by the incremental amount if the subsystem function has completed or the early time offset is increased if the subsystem function has not completed.

The method may further comprise starting a counter when the indication is provided and reading a count value from the counter by the driver when executed in response to the indication. The method may further comprise determining an estimated completion time of the subsystem function and providing an indication before the estimated completion time by an amount of time corresponding to the early time offset and adjusting early time offset using the count value.

It is now appreciated that a dynamic early indication system according to the present invention improves subsystem processing between a computer subsystem and its host processor by substantially reducing or otherwise eliminating indication or interrupt latency. For network embodiments, the present invention improves network processing between a network adapter or NIC and its host computer by substantially reducing or otherwise eliminating interrupt latency. In the configuration in which the early indicator is an early bit, a predetermined early time offset is used by the subsystem to assert interrupts early, where the early time offset is effectively an estimate of interrupt latency. The early time offset may be a best estimate value, a measured value or a calculated value based on a particular subsystem configuration. The early time offset may be fixed or programmable. In general, the driver is called to service the interrupt closer to when processing is actually needed. For configurations in which the early indicator is a programmable time value, the driver continuously and/or periodically adjusts the time value for more accurate results. The incremental adjust method enables a simple yet very effective design since the time value quickly converges on the interrupt latency, and then is continuously adjusted to closely track the interrupt latency.

A network controller system with dynamic early interrupts according to the present invention is particularly useful on network server systems. Data flow between the network adapter and host computer memory is processed much more quickly, thereby significantly increasing bandwidth and improving network traffic flow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
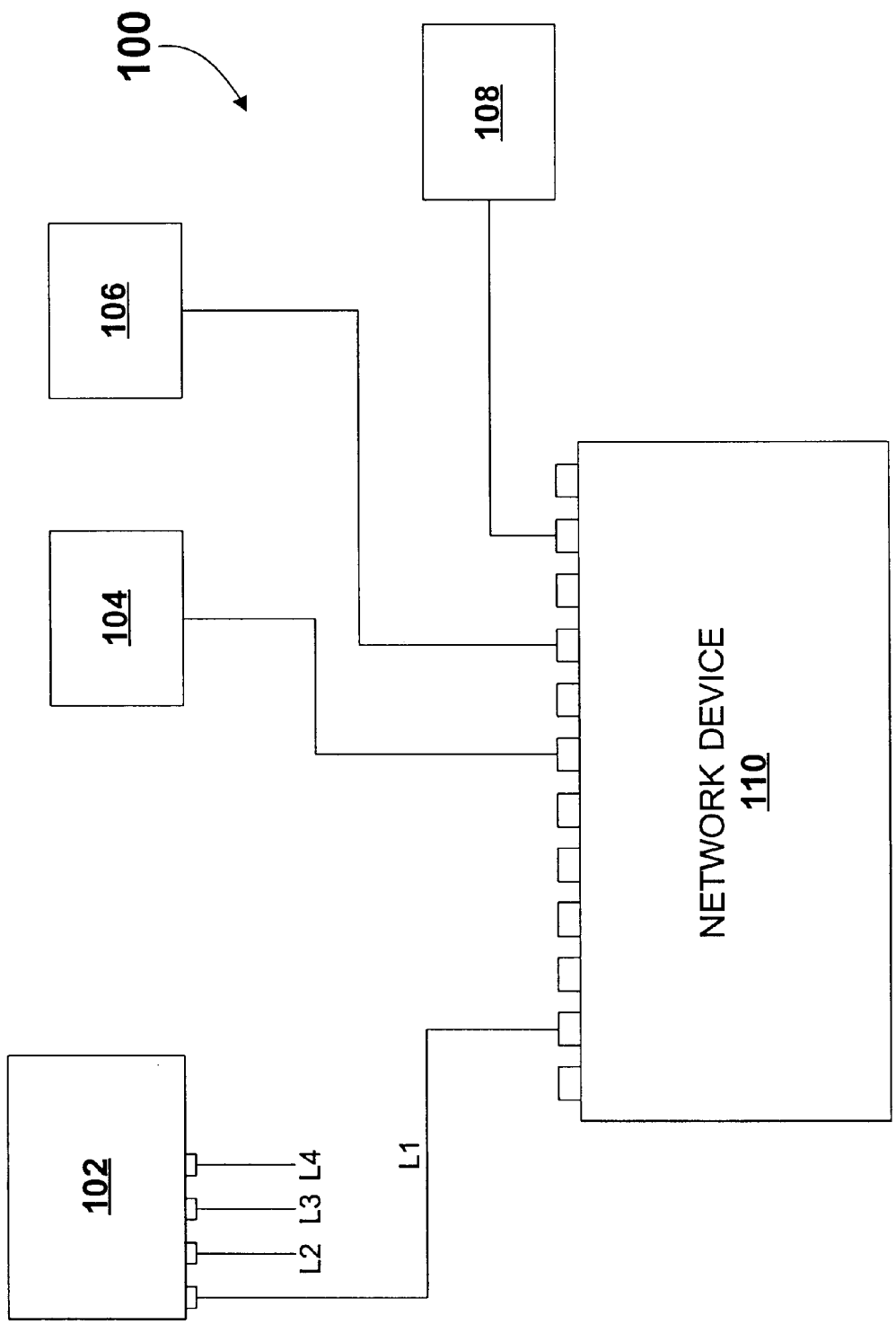
FIG. 1 is a block diagram of a network that enables a computer system implemented according to one embodiment of the present invention to communicate with one or more other devices.

Referring now to FIG. 1, a block diagram is shown of a network 100 that enables a computer system 102 to communicate with one or more other devices, such as devices 104, 106 and 108 as shown. The devices 104, 106 and 108 may be of any type, such as another computer system, a printer or other peripheral device, or any type of network device, such as a hub, a repeater, a router, a brouter, etc. The computer system 102 and the devices 104–108 are communicatively coupled together through a multiple port network device 110, such as a hub, repeater, bridge or switch, where each of the devices 104–108 is coupled to one or more respective ports of the network device 102. The network 100, including the network device 110, the computer system 102 and each of the devices 104–108, may operate according to any type of network architecture, such as Ethernet™, Token Ring, etc., or combinations of such architectures. In the embodiment shown, the network 100 operates according to Ethernet™ such as such as 10BaseT at 10 Megabits per second (Mbps), 100BaseTX at 100 Mbps, or 1 Gigabits per second (1 Gbps) Ethernet™. The network 100 may form any type of Local Area Network (LAN) or Wide Area Network (WAN), and may comprise an intranet and be connected to the Internet. For example, the device 108 may comprise a router that connects to an Internet provider.

The computer system 102 includes one or more adapter cards or network interface cards (NICs) to implement one or more network ports to enable the computer system to communicate on the network 100. As shown, for example, the computer system 102 includes multiple NICs, each with at least one corresponding port to enable communication via corresponding links L1, L2, L3 and L4. It is noted that a single NIC may be multi-headed and thus include multiple ports. The computer system 102 is coupled to the network device 110 via at least one link L1. The other links L2–L4 may be coupled to the network device 110, other data devices similar to the devices 104–108, or other network devices similar to the network device 110, as desired.

In the exemplary embodiment shown, the network 100 conforms to an Ethernet™ standard operating at 10 or 100 Mbps or 1 Gbps, although other network architectures are contemplated, such as Token Ring, Token Bus, ATM (Asynchronous Transfer Mode), etc. Ethernet™ is a packet-switched configuration in which messages are transmitted using variable length frames from 72 to 1518 bytes in length. Each packet or frame contains a header with the addresses of the source and destination stations or data devices and a trailer that contains error correction data. Higher-level protocols, such as IP (Internet Protocol) and IPX (Internetwork Packet eXchange), fragment long messages into the frame size required by the Ethernet™ network being employed. In contrast, ATM uses a cell-switched configuration in which all traffic is transmitted as fixed-length, 53 byte cells.

Figure 2:
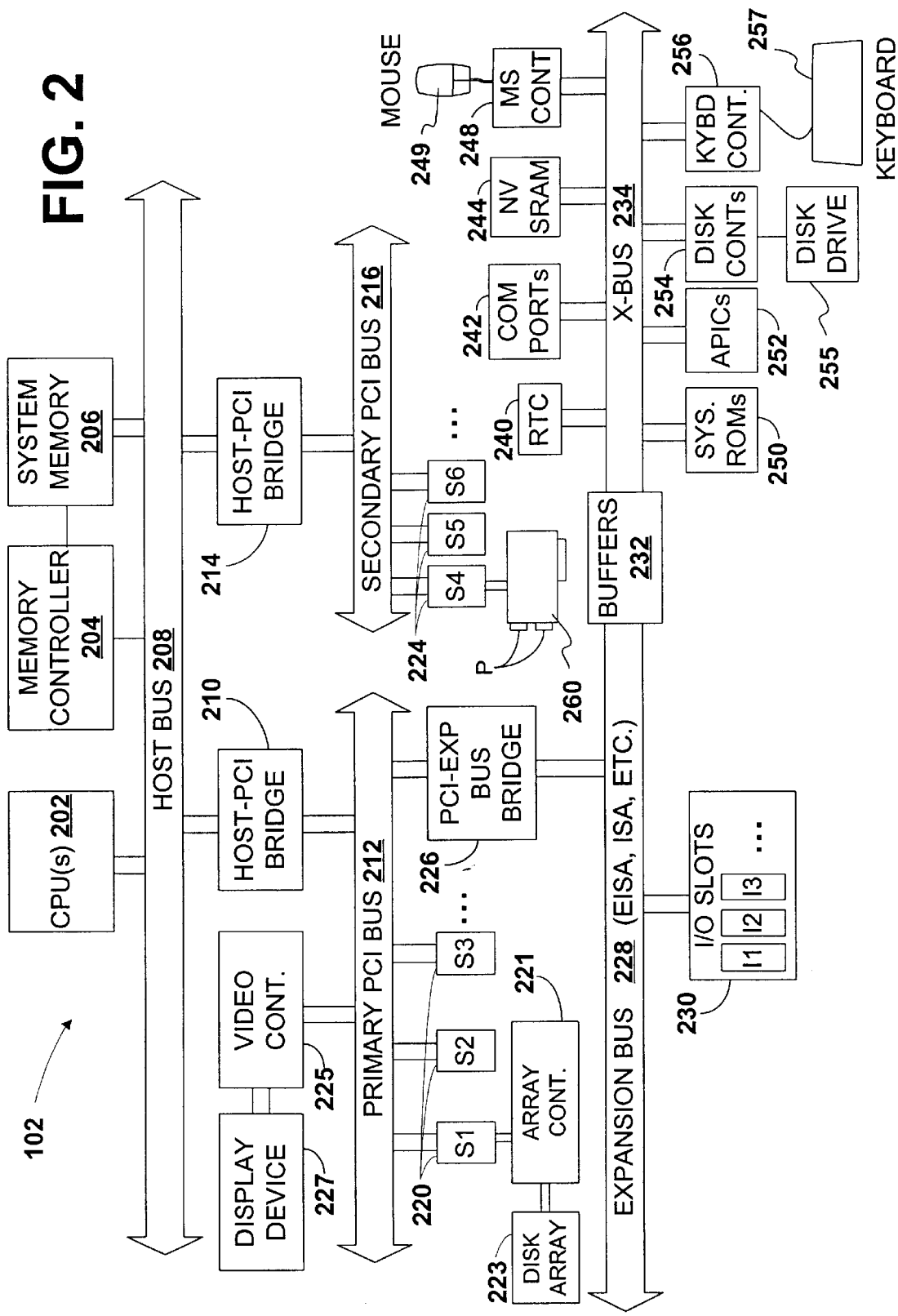
FIG. 2 is a system block diagram of an exemplary configuration of the computer system of FIG. 1.

Referring now to FIG. 2, a system block diagram is shown of an exemplary configuration of the computer system 102 incorporating a network controller system implemented according to the present invention. The computer system 102 is preferably an IBM-compatible, high-end personal computer (PC) system or the like typically used for workstations or server systems, although any type of desktop, portable or laptop computer is also contemplated. Although the present invention is illustrated using an IBM-compatible type computer system, it is understood that the present invention is applicable to other types of computer systems as known to those skilled in the art. The computer system 102 includes a host bus 208, which is coupled to one or more central processing units (CPUs) 202. Only one CPU 202 is shown, though it is understood that a multiprocessor computer system is also contemplated. The CPU 202 may include an appropriate processor and supporting circuitry, such as the 80486, Pentium™, or Pentium II™, etc. microprocessors from Intel Corp., although other types of processors are contemplated, such as the K6 microprocessor by Advanced Micro Devices. The external circuitry preferably includes an external or level two (L2) cache or the like (not shown). A memory controller 204 is coupled to the host bus 208 for interfacing system memory 206. The system memory 206 is preferably implemented with one or more memory boards plugged into compatible memory slots on the motherboard of the computer system 102.

The computer system 102 may include one or more peripheral, expansion, input/output (I/O) buses, etc. as desired. For example, the exemplary configuration includes a primary PCI bus 212 coupled to the host bus 208 via a Host-PCI bridge 210. The primary PCI bus 212 is typically implemented with one or more PCI slots 220, individually labeled S1, S2, S3, and so on. Each of the PCI slots 220 are configured to receive compatible PCI adapter cards incorporating one or more PCI devices as known to those skilled in the art. Typical PCI devices include network interface cards (NICs), disk controllers such as a SCSI (small computer systems interface) disk controller, video or graphics controllers, etc. In the exemplary configuration shown, for example, an array controller 221 is plugged into the slot S1 for coupling a disk array 223 of hard drives. One or more integrated PCI devices may also be included, which are typically integrated onto the motherboard itself and coupled directly to the primary PCI bus 212. In the exemplary configuration shown, for example, an integrated video controller 225 is coupled to PCI bus 212 for coupling to a display device 227, such as a monitor or any other type of output visual device for computer systems.

A secondary PCI bus 216 may also be provided and coupled to the host bus 208 through another Host-PCI bridge 214. The secondary PCI bus 216 is provided for further PCI expansion capability and includes one or more slots 224, which are consecutively numbered above the PCI slots S1–S3, such as PCI slots S4, S5, S6, etc. Although only six (6) PCI slots are shown, more PCI slots may be added to either PCI bus 212, 216 as needed or desired. Since the PCI buses 212 and 216 are both relatively independent and coupled through the host bus 208, they are referred to as "peer" PCI buses with respect to each other. Additional host peer PCI buses may be provided on the motherboard and coupled to the host bus 208 as desired. Each of the host peer PCI buses, such as the PCI buses 212 and 216 shown, may include one or more subordinate PCI buses as known to those skilled in the art. Subordinate PCI buses may be incorporated directly on the motherboard, but are usually provided on PCI adapter cards plugged into any one or more of the PCI slots S1–S6.

The computer system 102 includes an expansion bus 228 coupled to the primary PCI bus 228 through a PCI-Expansion bus bridge 226. The expansion bus 228 is any one of many different types, including the industry standard architecture (ISA) bus, the extended industry standard architecture (EISA) bus, the microchannel architecture (MCA) bus, etc. For high-end PC systems, the EISA bus provides greater performance, where the PCI-expansion bus bridge 226 is a PCI-EISA bridge. The expansion bus 228 preferably includes one or more expansion or input/output (1/0) slots 230, individually labeled 11, 12, 13, etc. Various devices incorporated on 1/0 adapter cards may be coupled to the expansion bus 228 through the 1/0 slots 230, including expansion bus memory, modems, disk controllers, sound cards, NICs and various other types of 5 controllers as known to those skilled in the art.

The expansion bus 228 also couples to a peripheral expansion bus referred to as the Xbus 234 through a set of bus buffers 232. The X-bus 234 is used for connecting various system components and peripherals to the computer system 102, such as system read only memories (ROMs) 250 comprising one or more ROM modules, one or more APICs (advanced programmable interrupt controllers) 252, one or more disk controllers 254 (such as a floppy disk controller (FDC) and a hard disk controller (HDQ for coupling corresponding floppy or hard disk drives 255, a keyboard controller 256 for coupling a keyboard 257, a real time clock (RTC) and timers 240, communication ports 242, non-volatile static random access memory (NVSRAM) 244, a mouse controller 248 for coupling a mouse 249, as well as other peripherals not shown, such as a direct memory access (DMA) system, diagnostics ports, command/status registers, battery-backed CMOS memory, etc.

In the exemplary embodiment shown, a NIC 260 is plugged into the PCI slot S4 of the secondary PCI bus 216 for enabling the computer system 102 to couple to and communicate with a comparable network, such as the network 100 shown in FIG. 1. The NIC 260 is shown with 2 network ports (P), although any number of ports may be included on the NIC 260 as desired and a single port NIC is also contemplated. For the network 100, the NIC 260 enables the computer system 102 to connect to the network device 110 via the link L1 as shown in FIG. 1. It is noted that the present invention is not limited to a NIC configuration, but also contemplates a network system integrated into a computer system, such as on the motherboard of the computer system 102.

Figure 3:
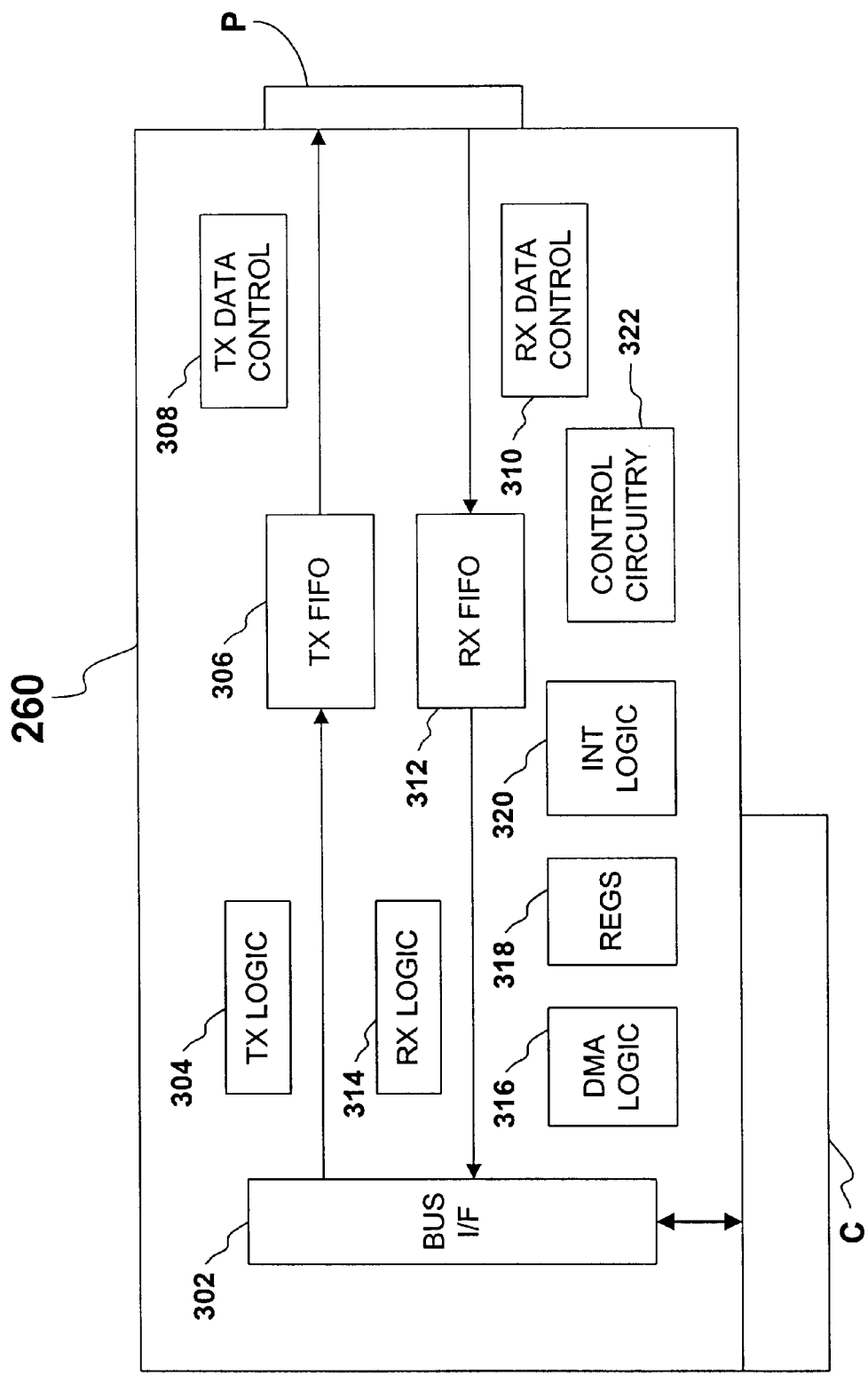
FIG. 3 is a block diagram of an exemplary configuration of the network interface card (NIQ of FIG. 2.

FIG. 3 is a block diagram of an exemplary configuration of the NIC 260. The NIC 260 includes a connector C that is configured to plug into a corresponding slot of a bus of the computer system 102, such as a PCI slot of one of the PCI buses 212 or 216. The NIC 260 includes one or more ports P for enabling the computer system 102 to couple to and communicate with a comparable network, such as the network 100 as previously described. Only one port P is shown for simplicity, although any number of ports may be included. The NIC 260 includes a bus interface (I/F) 302 for mechanically and electrically interfacing an appropriate bus of the host computer system. For PCI, the bus I/F 302 comprises a PCI bus interface with 32–64 address and 32–64 data bits and a clock rate of 33 to 66 MHz.

Transmit data is transferred from host memory, such as from the system memory 206, via the connector C and the bus I/F 302 to a TX FIFO (First In First Out memory data buffer) 306 by DMA logic 316 as controlled by TX logic 304. In one embodiment, the TX logic 304 cooperates with a corresponding driver 414 (FIG. 4) executed on the computer system 102 for the NIC 260 to maintain a transmit descriptor array (not shown) in the system memory 206. The TX logic 304 includes a TX list engine (not shown) that coordinates data flow from the system memory 206 to the TX FIFO 306. When data is available in the system memory 206 and the TX FIFO 306 has available buffers, the TX logic 304 queues a transfer request to the DMA logic 316, which eventually performs the transmit data transfer. Transmit data in the TX FIFO 304 is transferred to the port P and asserted on the coupled network under control of TX data control 308.

Receive data from the network via port P is provided to an RX FIFO 312 under control of an RX data control 310. The receive data from the RX FIFO 312 is transferred to the system memory 206 via the connector C and the bus I/F 302 by the DMA logic 316 as controlled by RX logic 314. In one embodiment, the RX logic 314 cooperates with the corresponding driver, such as the driver 414, to maintain a receive descriptor array (not shown) in the system memory 206. The RX logic 314 includes a RX list engine (not shown) that coordinates data flow from the RX FIFO 312 to the system memory 206. When there is receive data in the RX FIFO 312 and there is corresponding space in the system memory 206, the RX logic 314 queues a transfer request to the DMA logic 316, which performs the receive data transfer.

The NIC 260 also includes other supporting logic and circuitry, such as a plurality of registers (REGS) 318, interrupt logic 320 and control circuitry 322. The control circuitry 322 may include a processor or microprocessor for controlling various functions of the NIC 260. The interrupt logic 320 primarily functions to interrupt a host processor, such as the CPU 202 of the computer system 102, to request service for the NIC 260. The CPU 202 responds by executing an appropriate interrupt service routine (ISR), such as a driver configured for the NIC 260 (e.g. the driver 414) to handle the functions indicated by the interrupt. The present invention generally involves the timing of an interrupt signal asserted by the interrupt logic 320, as further described below.

Figure 4:
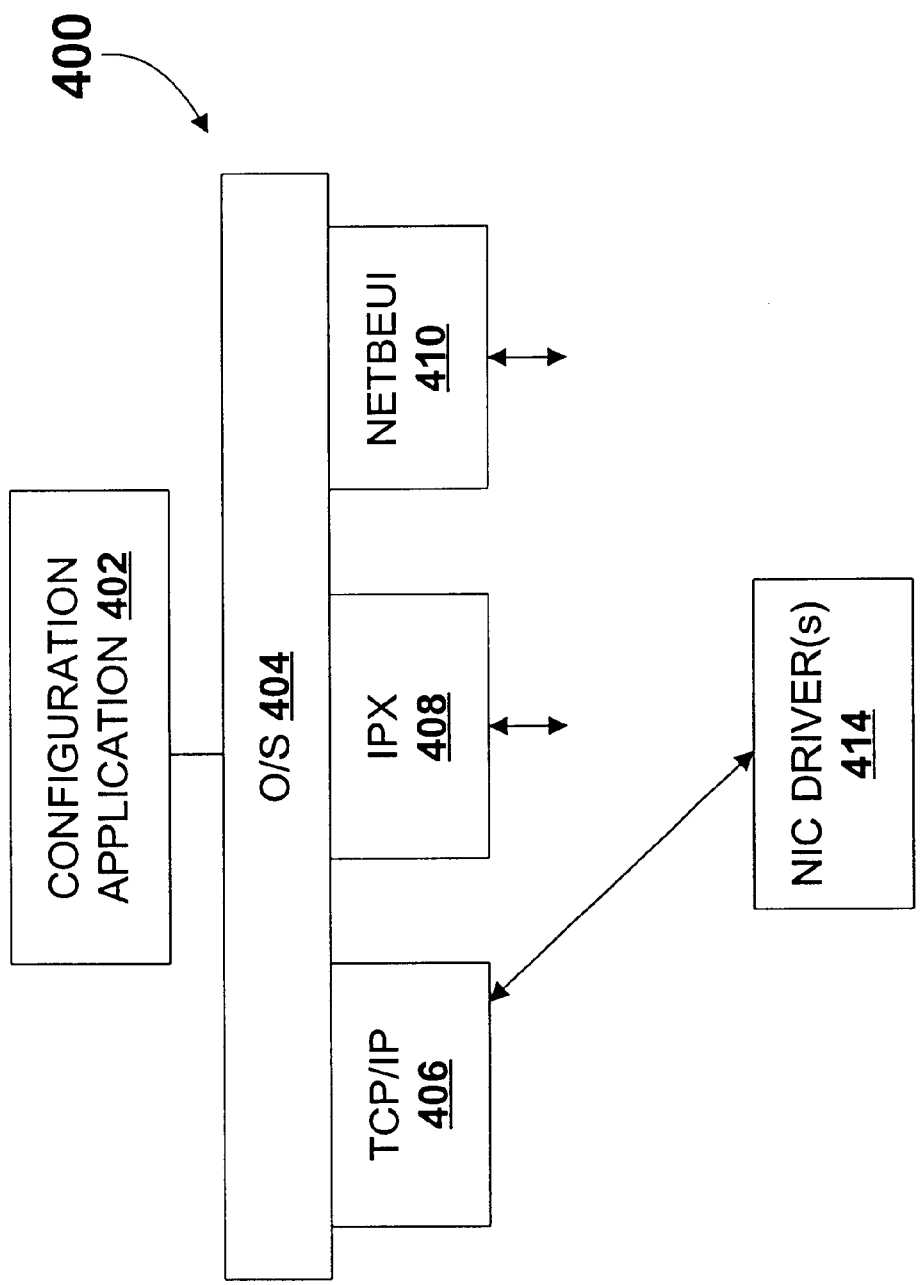
FIG. 4 is a block diagram of an exemplary controller software system installed on the computer system of FIG. 1 to communicatively interface the NIC of FIG. 2.

FIG. 4 is a block diagram of an exemplary controller software system 400 installed on the computer system 102. One or more NIC drivers 414 are installed on the computer system 102, each for supporting and enabling communications with a respective port of the NIC 260. The computer system 102 is installed with an appropriate operating system (O/S) 404 that supports networking, such as Microsoft NT, Novell Netware, or any other suitable network operating system. The O/S 404 includes, supports or is otherwise loaded with the appropriate software and code to support one or more communication protocols, such as TCP/IP (Transmission Control Protocol/Internet Protocol) 406, IPX (Internet Protocol eXchange) 408, NetBEUI (NETwork BIOS End User Interface) 410, etc. Each protocol binds with one or more NIC drivers to establish a communication link between a computer, such as the computer system 102, and a network, such as the network 100, that is supported by the bound NIC, such as the NIC 260. In general, binding a NIC port associates a particular communication protocol with the NIC driver and enables an exchange of their entry points. As shown in FIG. 4, the TCP/IP protocol 406 is bound to the NIC driver 414.

A configuration application 402 is also included that interfaces with the operating system 404 to enable a user of the computer system 102 to configure the mode of operation of the NIC 260 via one or more input devices, such as the mouse 249 and the keyboard 257, and one or more output devices, such as the display device 227.

The NIC 260 receives network data from the network 100 and transfers received data to the system memory 206, typically using a direct memory access DMA method that does not require involvement of the CPU 202. While a message is being transferred or after the message is transferred from the NIC 260 to the system memory 206, the interrupt logic 320 of the NIC 260 generates an interrupt to the CPU 202 to process the message. In a similar manner, after the NIC 260 transfers an out-going message from the system memory 206 to the NIC 260 and onto the network 100 via the link L1, the NIC 260 asserts a transmit acknowledge interrupt to the CPU 202. In the exemplary configuration shown, the APICs 252 are used to handle interrupts to the CPU 202. Thus, any interrupts from the NIC 260 are transferred via the PCI buses 216, 212, the host bus 208, the expansion bus 228 and the X-bus 234 and corresponding bridges 214, 210, 226 and the buffers 232. The APICs 252 then inform the CPU 202 of the interrupt and source of the interrupt, and the CPU 202 executes an ISR associated with the NIC 260.

The ISR is generally in the form of, or part of, a software driver or the like configured for a particular NIC. In the exemplary embodiment shown, the NIC driver 414 is configured to operate with at least one port of the NIC 260, and is executed by the CPU 202 from the system memory 206. The CPU 202 executing the NIC software driver 414 is collectively considered the "processing logic" that is used to service or processes network events and functions in response to interrupts originated by the NIC 260.

The time from when the interrupt is asserted by the NIC 260 to when the processing logic handles the interrupt is referred to as the interrupt latency. The interrupt latency may significantly affect the overall efficiency of the computer system 102 and of processing network communications. One possible solution is to move the NIC 260 to the primary PCI bus 212 in an attempt to reduce the path to the APICs 252 and thus the interrupt latency. The affect on the interrupt latency may depend, however, on the traffic of the primary PCI bus 212. The array controller 221 and disk array 223 may cause the latency to increase rather than decrease or to not be significantly affected.

Another possible solution is to determine an approximate interrupt latency period of the computer system 102 on the network 100 and cause the interrupt logic 320 of the NIC 260 to assert the interrupt early by the approximate latency period. For example, during a receive operation, the NIC 260 receives a packet from the network 100 and begins transferring the packet to the system memory 206. Normally, a NIC waits until the packet is completely transferred to the system memory before asserting an interrupt. For an "early interrupt" the NIC 260 calculates an approximate time, called the packet transfer time, for the packet to be completely transferred to the system memory 206 using the packet size and a measured or determined transfer rate. The NIC 260 subtracts the latency period from the packet transfer time to determine a delay time after the start of the packet transfer. The NIC 260 asserts the interrupt early, after the expiration of the delay time, in an attempt to have the processing logic begin handling the interrupt at approximately the same time that the packet transfer is completed.

Efficiency may be improved with early interrupts even if the processing logic is late, since a certain amount of the interrupt latency occurs in parallel with the packet transfer. Efficiency is maximized if the processing logic begins responding at the same time that the packet transfer completes. For example, if the processing logic is too early, inefficiency may result since the CPU 202 is unable to do any other processing while waiting for the transfer to complete. Thus, an early interrupt may cause wasted CPU time. If the processing logic terminates the suspended interrupt handling routine to resume other processing, a substantial inefficiency results since the CPU time is completely wasted during the failed interrupt and the CPU 202 must be interrupted again (or execute the software driver again) to process the received packet.

During relatively slow network traffic conditions, the network traffic is generally serial in nature in which a packet is often sent in response to a packet before another packet is received. During such slow, serial traffic conditions, early interrupts using a fixed estimate of interrupt latency generally improves the overall network processing of the computer system 102. During higher traffic conditions, multiple packets are often received in parallel from multiple devices. During such higher, parallel traffic conditions, early interrupts may have a negative impact on efficiency. One solution is to provide a mechanism to manually enable or disable early interrupts. With such a manual mechanism, a network administrator has the option to enable early interrupts if slower network traffic conditions are contemplated, or to disable early interrupts if higher network traffic conditions are contemplated. Simply enabling or disabling early interrupts may cause inefficiency for many networks during some operating periods. There are both benefits and hindrances during network operations for both situations in which early interrupts are enabled or disabled.

Figure 5:
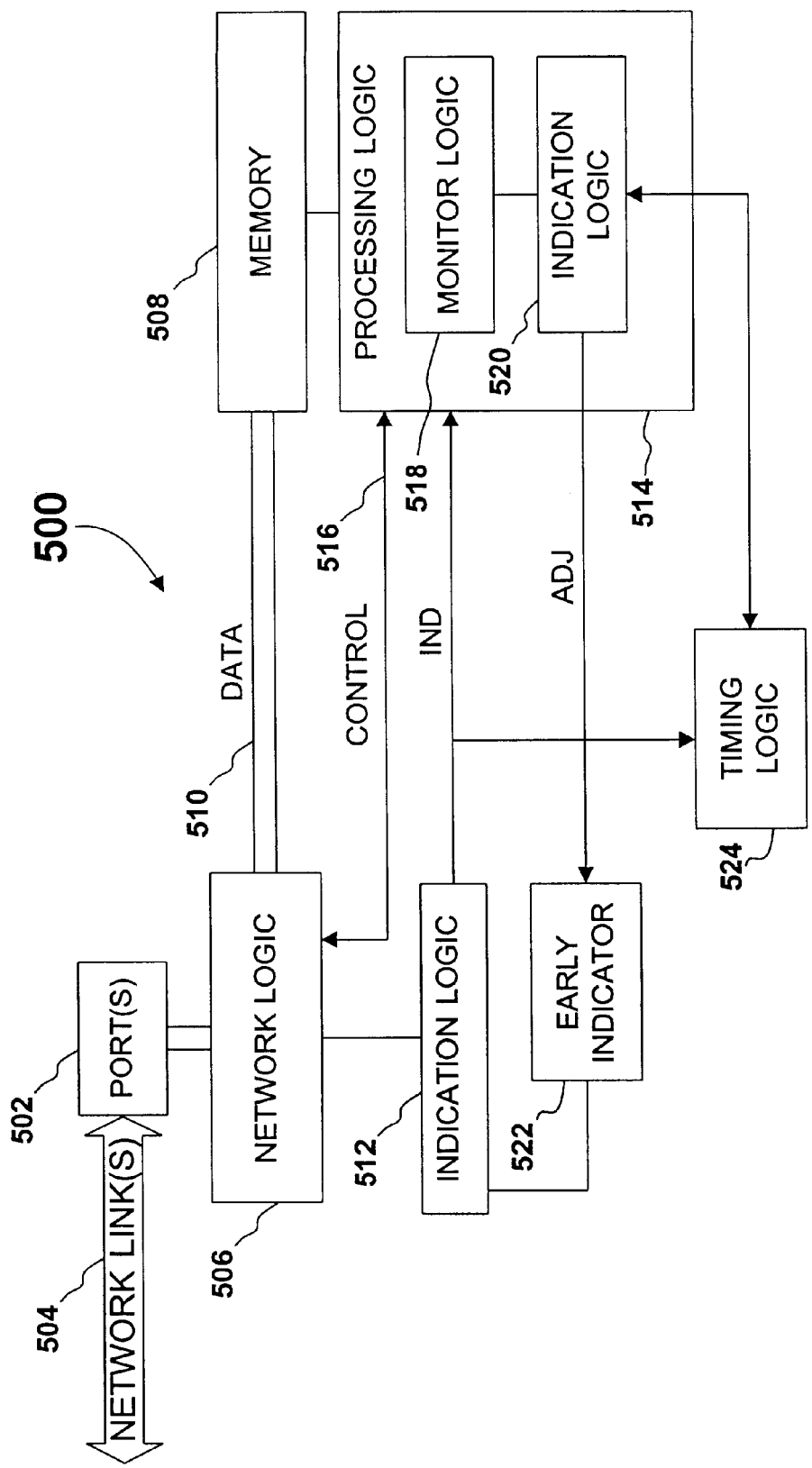
FIG. 5 is a simplified block diagram of a network controller system implemented according to one embodiment of the present invention including an early indicator.

FIG. 5 is a simplified block diagram of a network controller system 500 implemented according to the present invention. One or more ports 502 couple a corresponding one or more network links to network logic 506. The network logic 506 performs any network function including those requiring further processing when completed. One such function that the network logic 506 performs is transfer of data between the ports 502 and a memory 508 via a data bus 510. Indication logic 512 provides an indication signal (IND) to processing logic 514 to request service for the network logic 506. The processing logic 514 may comprise a processor executing driver code, as further described below. The processing logic 514 responds by executing and servicing the network logic 506 via one or more control signals 516. In a similar manner as described previously, the indication signal corresponds to an interrupt signal and has an associated delay or latency from the time it is asserted until the processing logic 514 handles the request. The processing logic 514 includes monitor logic 518 that monitors the efficiency of network communication and indication logic 520 that controls an early indicator 522 via an adjust (ADJ) signal. The early indicator 522 is used by the indication logic 512 to control when to assert the indication signal in an attempt to improve the efficiency of communications.

If implemented on the computer system 102, the processing logic 514 may represent the CPU 202 executing the NIC driver 414, where the memory 508 represents the system memory 206. The ports 502, the network logic 506 and the indication logic 512 could be implemented on a network adapter card, such as the NIC 260. The network logic 506 incorporates one or more of the bus I/F 302, the TX logic 304, the TX FIFO 306, the TX data control 308, the RX logic 314, the RX FIFO 312, the RX data control 310, the DMA logic 316, the registers 318 and the control circuitry 322, among other logic and circuitry as desired. It is noted that the network logic 506 may perform functions other than transmitting and receiving data and handling data transfers to and from the memory 508, such as receiving and executing commands from the processing logic 514. The indication logic 512 may assert the indication signal to report to the processing logic 514 that the command is completed. The network logic 506 may collect and monitor network statistics, and the indication logic 512 may be used to inform the processing logic 514 of important statistical changes. Although an early indication is usually associated with transfer of data to and from the memory 508 or transmission of data via the port(s) 502, an early indication may improve efficiency for any network event that may be anticipated and the timing estimated.

The early indicator 522 has one of several different forms depending upon the particular embodiment. In a first case, the early indicator 522 may simply comprise an early bit that the indication logic 520 controls and that the indication logic 512 uses to determine whether to assert the indication signal early. For example, if the monitor logic 518 detects heavy network traffic or that the processing logic 514 is executing early too often, then the monitor logic 518 informs the indication logic 520 to clear the early bit. When the early bit is cleared, the indication logic 512 asserts the indication signal after a network event has completed rather than asserting the indication signal early. If, however, the monitor logic 518 detects light network traffic or the processing logic 514 usually being executed late, then the monitor logic 518 informs the indication logic 520 to set the early bit. When the early bit is set, the indication logic 512 asserts the indication signal early by a predetermined time period. In this manner, the processing logic 514 and the indication logic 512 dynamically switch the early indication based on network monitoring the network traffic conditions.

In an alternative embodiment, the early indicator 522 comprises a time value that the indication logic 512 uses to determine how early to assert the indication signal. The indication logic 520 periodically or continuously adjusts the early indicator 522 time value to periodically or continuously adjust the timing of the indication signal. Of course, the time value may be set to zero to turn off early indication. In one embodiment, the monitor logic 518 includes logic for determining a time difference between an actual completion time of the network function performed by the network logic 506 and a response time of the processing logic 514. The monitor logic 518 causes the indication logic 520 to adjust the early indicator 522 time value using the determined time difference in an attempt to reduce subsequent time differences to improve efficiency of network processing. Alternatively, when the processing logic 514 is executed to perform the network processing, the monitor logic 518 simply determines whether the network logic 506 has completed the network function. In this latter case, the indication logic 520 adjusts the early indicator 522 time value by an incremental amount so that the time value eventually corresponds to indication latency after several iterations.

In yet another embodiment, timing logic 524 is included which detects the assertion of the indication signal and starts timing or counting. The indication logic 520 of the processing logic 514 reads the time or count value of the timing logic 524 when the processing logic 514 services the network logic 506. In this manner, the processing logic 514 determines the elapsed time or latency of the indication signal. The indication logic 520 resets the timing logic 524 after accessing the timing logic, or the timing logic 524 is automatically reset upon reading it. In either case, the processing logic 514 continuously or periodically monitors the indication latency. The indication latency may be used in any one or more of several manners. The indication logic 520 may use the indication latency to adjust the early indicator if it comprises a timing value. Alternatively, the indication latency may be used for purposes of management, in which case the indication latency is reported. For example, the indication latency may be reported to the configuration application 402, so that a network administrator may use the information to adjust network parameters or operation of the computer system 102 to improve overall efficiency.

Figure 6:
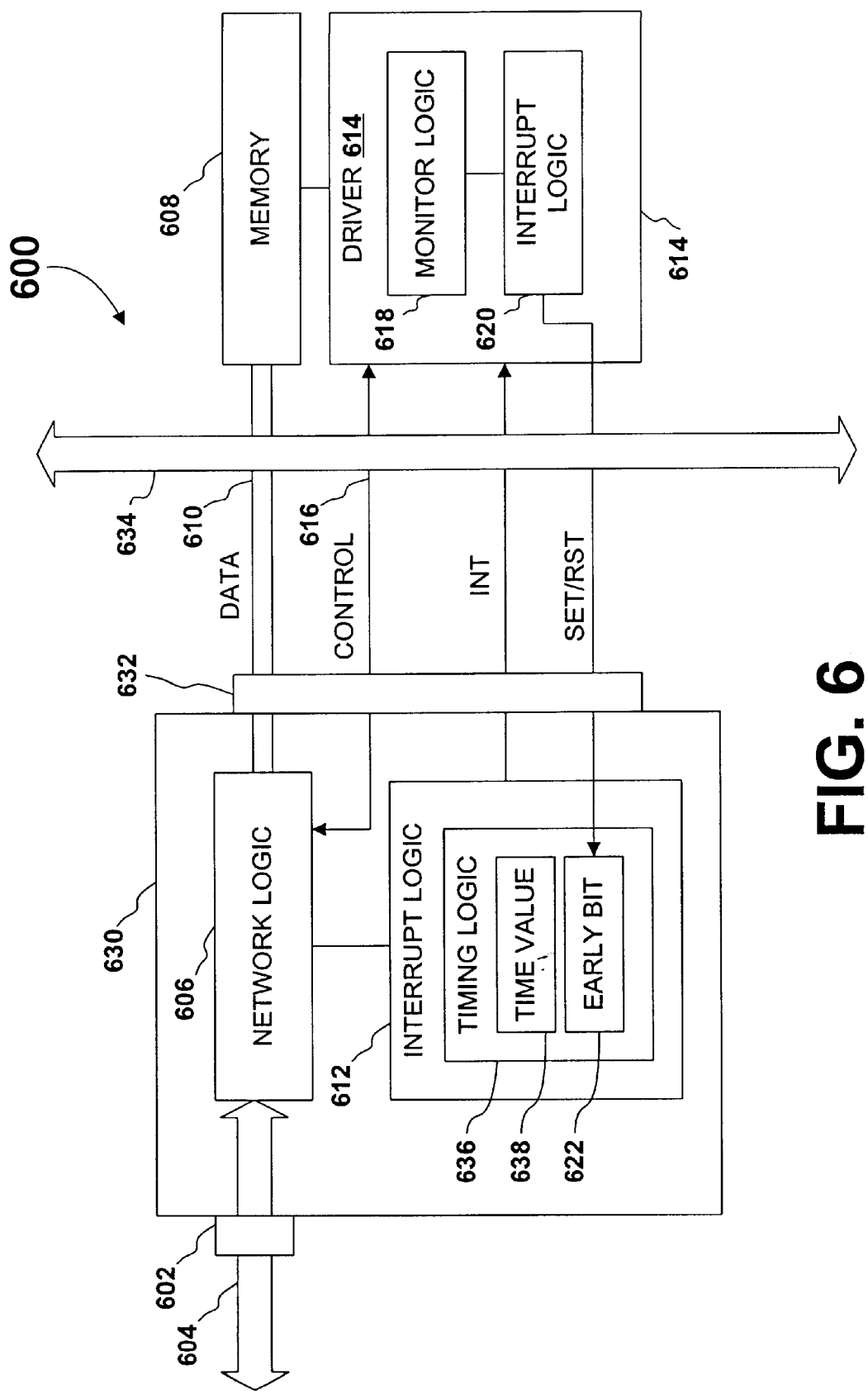
FIG. 6 is a block diagram of an exemplary network controller system in which the early indicator of FIG. 5 comprises an early bit.

FIG. 6 is a block diagram of an exemplary network controller system 600, which is a more specific embodiment of the network controller system 500 in which the early indicator 522 comprises an early bit 622. In a similar manner as the network controller system 500, the network controller system 600 includes one or more ports 602 that couple a corresponding one or more network links to network logic 606. The network logic 606 transfers data between the ports 602 and a memory 608 via a data bus 610. Interrupt logic 612, corresponding to the interrupt logic 320 previously described, provides an interrupt signal (INT), which eventually causes a driver 614 to be executed by a corresponding processor to request service for the network logic 606. The driver 614 services the network logic 606 via one or more control signals 616. The interrupt signal has an interrupt latency from the time it is asserted until the driver 614 handles the request. The driver 614 also includes monitor logic 618 that monitors the efficiency of network communication and interrupt logic 620 that controls the early bit 622 of the interrupt logic 612 via a set/reset (SET/RST)

signal. The early bit 622 is used by the interrupt logic 612 to determine whether or not to assert the interrupt signal early.

The network controller system 600 illustrated corresponds with the computer system 102, where the port(s) 602, the network logic 606 and the interrupt logic 612 are implemented on a network adapter 630, such as the NIC 260. The network adapter 630 includes a compatible connector 632 for coupling to a bus system 634 of an appropriate computer system. The bus system 634 may represent the various buses of the computer system 102, including the PCI buses 216, 212, the host bus 208, the expansion bus 228 and the X-bus 234, as well as the corresponding bridges 214, 210, 226 and buffers 232. The memory 608 corresponds to the system memory 206 and the driver 614 represents the NIC driver 414 as executed by the CPU 202.

The interrupt logic 612 of the network adapter 630 may further include timing logic 636 which incorporates the early bit 622 and a timing value 638. The timing value 638 may be fixed or could be programmable by control logic, such as by the driver 614. In any event, if the early bit 622 is cleared, the interrupt logic 612 asserts the interrupt signal in a normal manner in response to network events requiring service by the driver 614. If the early bit 622 is set, the interrupt logic 612 asserts the interrupt signal early, if possible, by the time value 638 as calculated by the timing logic 636. For example, if the network logic 606 is transferring a packet received by the port(s) 602 to the memory 608, the timing logic 636 calculates the transfer time for the data transfer using the size of the packet and the transfer rate, if known. The transfer rate may be known and programmed or is measured over time in bytes per second or kilobytes per second (KB/s). The timing logic 636 subtracts the time value 638 from the calculated or estimated transfer time to determine a time offset value. After the time offset value expires starting when the transfer begins, the interrupt logic 612 asserts the interrupt signal. In this manner, the driver 614 should start executing at approximately the same time as the completion of the transfer of the packet to the memory 608.

The monitor logic 618 monitors the efficiency of the interrupts and determines whether to use the early interrupt or not. If not, the monitor logic 618 instructs the interrupt logic 620 to turn off early interrupts by clearing the early bit 622 via the set/reset signal. For example, if the monitor logic 618 detects that the driver 614 is being executed too early too often or for a significant percentage of the time, so that the processing power of the CPU 202 is being wasted, the early bit 622 is cleared. If and when the monitor logic 618 detects that early interrupts would be advantageous, such as when the traffic of the network 100 is not as high, the early bit 622 is set to enable early interrupts.

Figure 7:
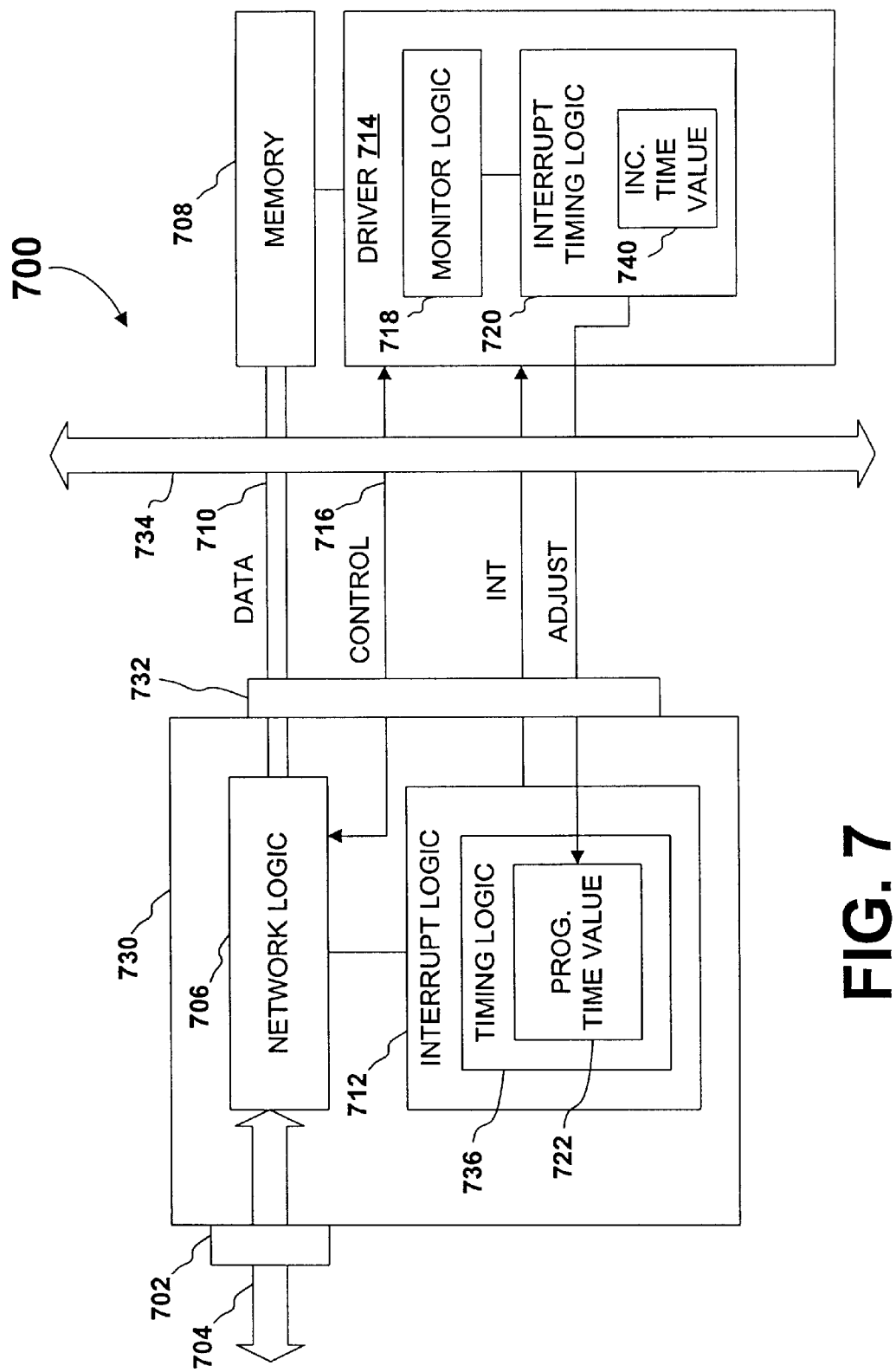
FIG. 7 is a block diagram of an exemplary network controller system in which the early indicator of FIG. 5 comprises a programmable time value.

FIG. 7 is a block diagram of an exemplary network controller system 700, which is a more specific embodiment of the network controller system 500 in which the early indicator 522 comprises a programmable time value. In a similar manner as the network controller systems 500 and 600, the network controller system 700 includes one or more ports 702 that couple a corresponding one or more network links to network logic 706. The network logic 706 transfers data between the ports 702 and a memory 708 via a data bus 710. Interrupt logic 712, corresponding to the interrupt logic 320 previously described, provides an interrupt signal (INT), which eventually causes a driver 714 to be executed by a corresponding processor to request service for the network logic 706. The driver 714 services the network logic 706 via one or more control signals 716. As before, the interrupt signal has an interrupt latency from the time it is asserted until the driver 714 handles the request. The driver 714 also includes monitor logic 718 that monitors the efficiency of network communication, and interrupt timing logic that controls a programmable time value 722 of the interrupt logic 712 via an adjust signal. The time value 722 is used by the interrupt logic 712 to determine how early to assert the interrupt signal.

The network controller system 700 may also correspond with the computer system 102 in a similar manner as the network controller system 600, where the port(s) 702, the network logic 706 and the interrupt logic 712 are implemented on a network adapter 730, which represents the NIC 260. The network adapter 730 includes a compatible connector 732 for coupling to a bus system 734 of an appropriate computer system. The bus system 734 may represent the various buses of the computer system 102 in a similar manner as described above for the network controller system 600. The memory 708 corresponds to the system memory 206 and the driver 714 represents the NIC driver 414 as executed by the CPU 202.

The interrupt logic 712 of the network adapter 730 further includes timing logic 736 which incorporates the time value 722. The interrupt logic 712 asserts the interrupt signal early by a time that corresponds with the time value 722 as calculated by the timing logic 736. For example, if the network logic 706 is transferring a packet received by the port(s) 702 to the memory 708, the timing logic 736 calculates the transfer time for the data transfer using the size of the packet and the transfer rate, if known. The transfer rate is determined as previously described. The timing logic 736 subtracts the time value 722 from the transfer time to determine a time offset value. After the time offset value expires starting when the transfer begins, the interrupt logic 712 asserts the interrupt signal. In this manner, the driver 714 should start executing at approximately the same time as the completion of the transfer of the packet to the memory 708.

The monitor logic 718 monitors the efficiency of the interrupts and adjusts the time value 722 to adjust the early interrupt. In one embodiment, the monitor logic 718 measures the time difference between when the interrupt signal is asserted and when the driver 714 responds and adjusts the time value 722 by the measured time difference. For example, if the interrupt signal is too early by a certain time, the interrupt timing logic 720 reduces the time value 722 by the certain time and if the interrupt signal is too late by a certain time, then the interrupt timing logic 720 increases the time value 722 by the certain time. It is noted, however, that such a scheme of measuring the time difference may require additional timing logic and/or counters.

In the embodiment shown in FIG. 7, the interrupt timing logic 720 includes or otherwise uses an incremental time value 740 that is used to adjust the time value 722 by an incremental time amount. In particular, if the monitor logic 718 detects that the driver 714 is executed early, it instructs the interrupt timing logic 720 to decrease the time value 722 by the incremental time value and if the monitor logic 718 detects that the driver 714 is executed late, it instructs the interrupt timing logic 720 to increase the time value 722 by the incremental time value. The monitor logic 718 may determine whether the driver 714 is executed early or late simply by determining if the network logic 706 has completed its network function. For a data transfer to the memory 708, for example, the monitor logic 718 determines whether the data transfer is complete. The time value 722 is initially set to zero, so that the first interrupt is late by approximately the latency period. The interrupt timing logic 720 thus increases the time value 722 by the incremental time value 740 so that in the first pass, the time value 722 equals the time value 740. This process repeats until the time value 722 closely approximates the interrupt latency period.

The incremental time value 740 is chosen small enough to achieve a relative degree of accuracy and significant processing waiting periods, but large enough to close in on the interrupt latency in an adequate amount of time. The actual value of the incremental time value 740 may depend on the relative speed of the network 100. For example, the incremental time value 740 could be approximately 10 microseconds ($\mu$s) for 10 Mbps, 1 $\mu$s for 100 Mbps and 0.1 $\mu$s for 1 Gbps. The incremental time value 740 may be programmable and modified to achieve an appropriate value depending upon the particular environment or network. The incremental time value 740 is implemented in any one of several manners. It may comprise a programmable memory location or register. It may comprise a programmable software variable. It may comprise a predetermined or fixed value integrated within software.

The time value adjust method using the incremental time value 740 illustrated in FIG. 7 provides several advantages. A hardware implementation is relatively simple since only one memory location or register value is needed on the network adapter 730 to implement the time value 722. The incremental time value 740 may be implemented as a software variable and 20 modifiable via the configuration application 402 if desired, such as by a network administrator. The monitor logic 718 need only determine when the driver 714 has been executed relative to the logic function being performed by the network logic 706. The time value 722 is constantly adjusted to approximate the interrupt latency so that efficiency is maximized. Should the interrupt latency change for any reason in either direction positive or negative, the interrupt timing logic 720 automatically adjusts the time value 722 accordingly to eventually close in on the new interrupt latency.

Figure 8:
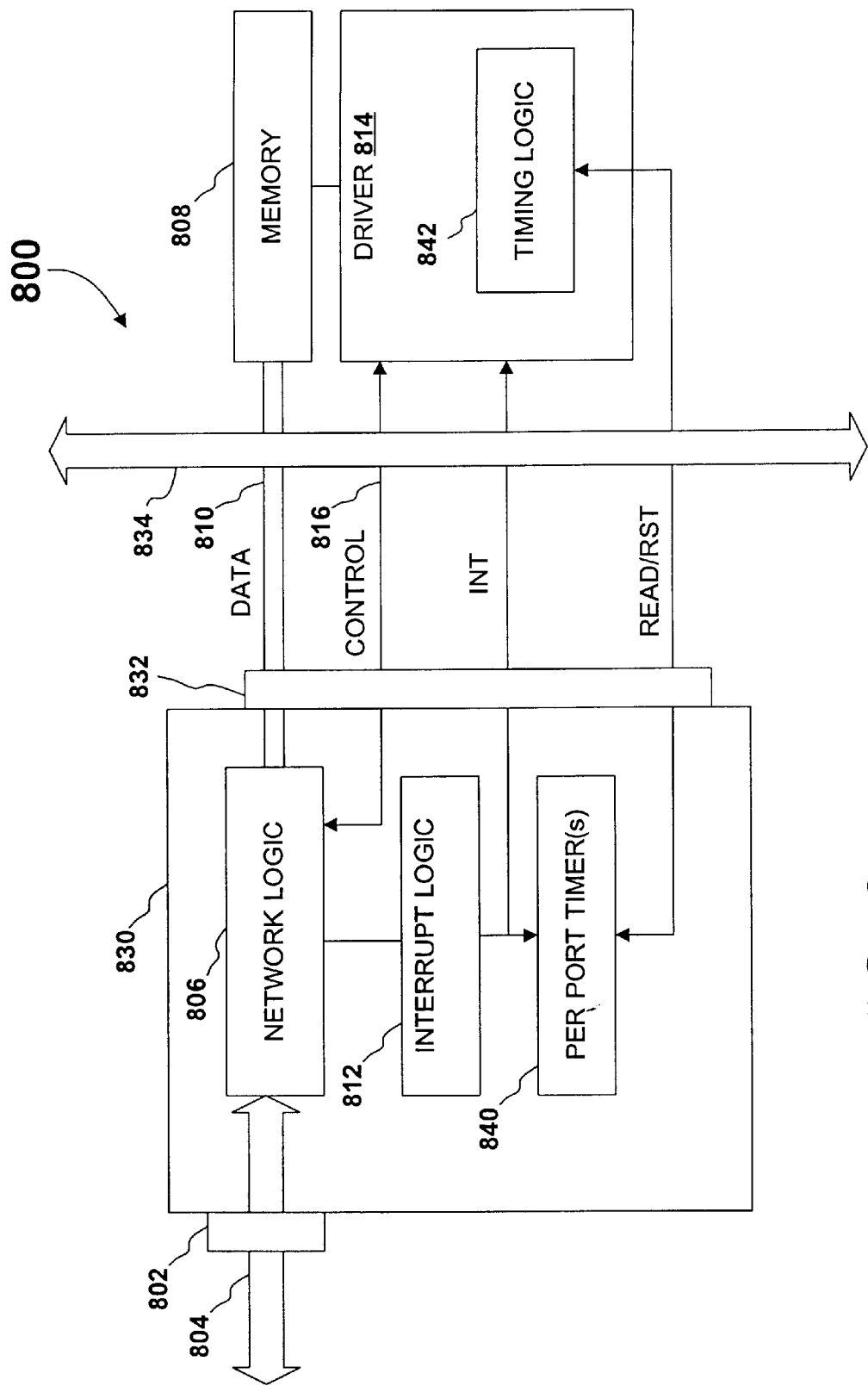
FIG. 8 is a block diagram of an exemplary network controller system including per port timers that each measure interrupt latency for a corresponding port.

FIG. 8 is a block diagram of another exemplary network controller system 800. In a similar manner as the network controller systems 500, 600 and 700, the network controller system 800 includes one or more ports 802 that couple a corresponding one or more network links to network logic 806. The network logic 806 transfers data between the ports 802 and a memory 808 via a data bus 810. Interrupt logic 812, corresponding to the interrupt logic 320 previously described, provides an interrupt signal (INT), which eventually causes a driver 814 to be executed by a corresponding processor to request service for the network logic 806. The driver 814 services the network logic 806 via one or more control signals 816. As before, the interrupt signal has an interrupt latency from the time it is asserted until the driver 814 handles the request.

The network controller system 800 may also correspond with the computer system 102, where the port(s) 802, the network logic 806 and the interrupt logic 812 are implemented on a network adapter 830, which represents the NIC 260. The network adapter 830 includes a compatible connector 832 for coupling to a bus system 834 of an appropriate computer system. The bus system 834 may represent the various buses of the computer system 102 in a similar manner as described above for the network controller systems 600 and 700. The memory 808 corresponds to the system memory 206 and the driver 814 represents the NIC driver 414 as executed by the CPU 202.

The network adapter 830 further includes one or more per port timer(s) 840. The timers may be implemented in any suitable manner, such as using an incremental timer or suitable register. A separate timer is provided for each of the one or more ports 802. When the interrupt logic 812 asserts the interrupt signal, a corresponding timer of the timers 840 is started. The driver 814 includes timing logic 842 that reads an interrupt latency value via a read/reset signal from the timer 840 when the driver 814 is first initiated. Thus, the interrupt latency value represents the lapse of time from when the interrupt signal is asserted to when the driver 814 responds to the interrupt. The timing logic 842 may further reset a corresponding timer 840 after reading the interrupt latency value. Alternatively, each timer 840 may be configured to be automatically reset upon being read. The timing logic 842 may be configured to read a corresponding timer 840 each time the driver 814 is executed to keep track of the interrupt latency value. Alternatively, the timing logic 842 reads a timer 840 according to any desired periodic basis. It is noted that the interrupt logic 812 could assert the interrupt signal again once the corresponding timer 840 is initiated. It is desired, however, that each of the one or more timers 840 be reset only after being read by the timing logic 842 to obtain an accurate measure of interrupt latency.

The driver 814 may use the interrupt latency value in any one or more of several different ways. The interrupt latency value may be tracked and reported to the configuration application 402 for purposes of management. The interrupt latency value may be reported to the configuration application 402 only if it exceeds a predetermined threshold. In any event, a system administrator may use the interrupt latency measurement to make adjustments in an attempt to reduce or otherwise improve the interrupt latency if desired. For example, the administrator could choose to relocate the NIC 260 to another PCI bus, such as the PCI bus 212 in an attempt to reduce interrupt latency.

Alternatively, the network controller system 800 may be implemented in a similar manner as the network controller system 700 in which the driver 814 includes the monitor logic 718 and the interrupt timing logic 720 and in which the interrupt logic 812 includes the timing logic 736 and the programmable time value 722. In this embodiment, the interrupt latency value from the timer 840 may be used to adjust the time value 722 to achieve a faster and possibly more accurate estimate of the interrupt latency.

Figure 9:
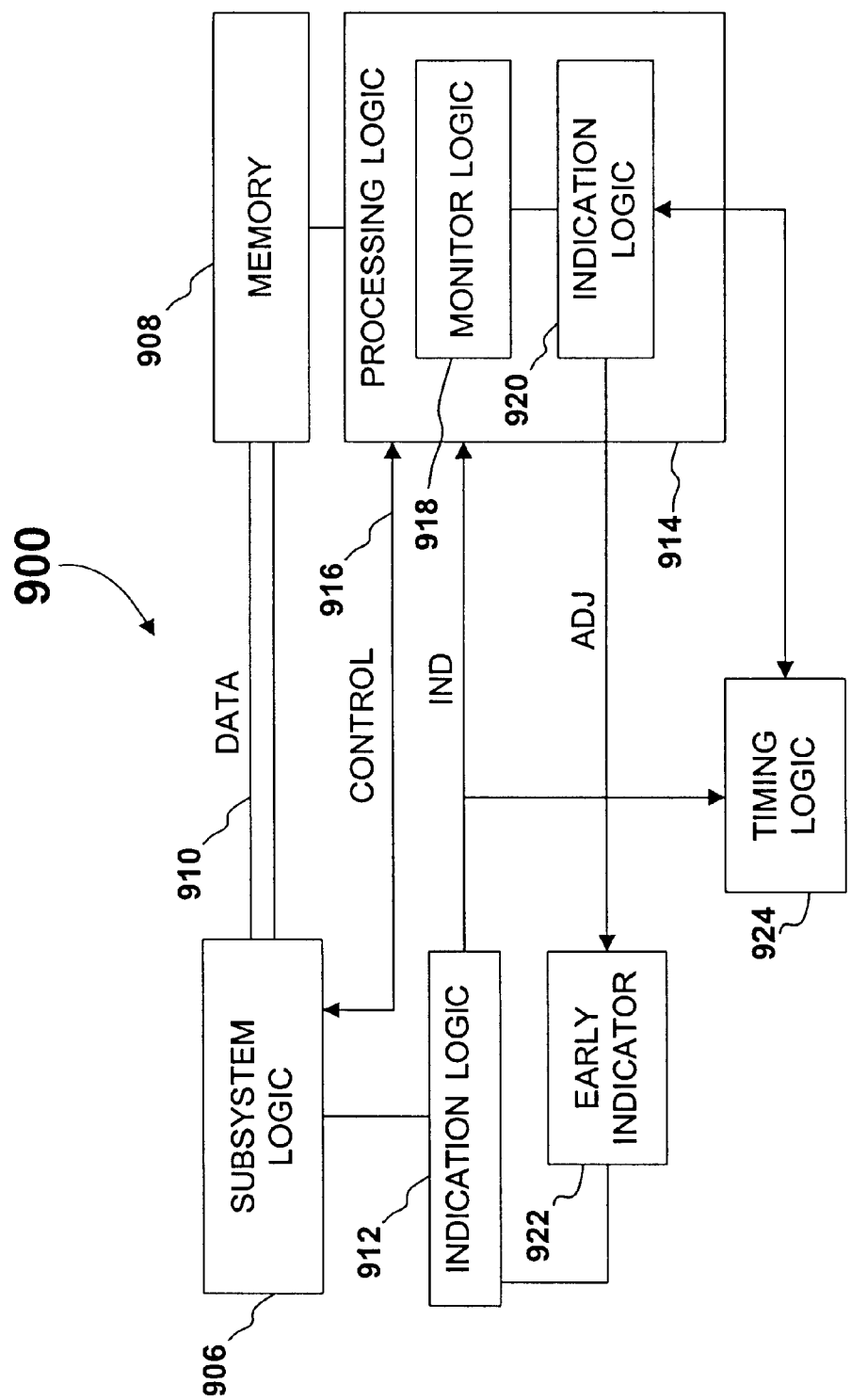
FIG. 9 a simplified block diagram of a dynamic early indication system including an early indicator implemented according to one embodiment of the present invention.

FIG. 9 is a simplified block diagram of an indication system 900 implemented according to more general embodiments of the present invention. The previously described embodiments have illustrated the invention for use in communication systems, particularly network embodiments. FIG. 9 illustrates that the present invention applies equally to any type of computer subsystem in which an indication, such as an interrupt, is provided to request processing associated with a function of the subsystem, such as a predetermined function or a function that is to be reported to the processor of the host system, such as the CPU 202. Thus, although the present invention is useful for communication systems including network systems, the present invention contemplates any type of computer subsystem.

Subsystem logic 906 is provided which performs any type of functions associated with the particular type of subsystem, particularly functions that are to be reported to a processor of a computer system for associated processing. The subsystem logic 906 may be associated with any type of communication system, such as analog or digital modems, network cards, adapter cards, sound systems and sound cards, video systems and video cards, as well as any other type of computer subsystem, such as those involving data transfer systems, disk controllers, internal or external data transfers, etc. The subsystem logic 906 may be implemented within the primary portion of a computer system, such as on the motherboard, or may be implemented on an expansion card plugged into a peripheral or expansion bus of a computer.

Indication logic 912 provides an indication signal (IND) to processing logic 914 to request service for the subsystem logic 906. The processing logic 914 may comprise a processor executing driver code, such as the CPU 202 that executes a driver associated with the subsystem logic 906. The processing logic 914 responds by servicing the subsystem logic 906 via one or more control signals 916. In a similar manner as described previously, the indication signal corresponds to an interrupt signal and has an associated delay or latency from the time it is asserted until the processing logic 914 handles the request. The processing logic 914 includes monitor logic 918 that monitors efficiency of indication handling and associated processing of functions of the subsystem logic 906. The processing logic 914 also includes indication logic 920 that controls an early indicator 922 via an adjust (ADJ) signal. The early indicator 922 is used by the indication logic 912 to control when to assert the indication signal in an attempt to improve the efficiency of indication handling.

The early indicator 922 has one of several different forms depending upon the particular embodiment. In a first case, the early indicator 922 may simply comprise an early bit that the indication logic 920 controls and that the indication logic 912 uses to determine whether to assert the indication signal early. For example, if the monitor logic 918 detects that the processing logic 914 is executed early, or early too often, then the monitor logic 918 informs the indication logic 920 to clear the early bit. When the early bit is cleared, the indication logic 912 asserts the indication signal after a subsystem event associated with a particular function has completed rather than asserting the indication signal early. If, however, the monitor logic 918 detects that the processing logic 914 usually executed late, or late too often, then the monitor logic 918 informs the indication logic 920 to set the early bit. When the early bit is set, the indication logic 912 asserts the indication signal early by a predetermined time period. In this manner, the processing logic 914 and the indication logic 912 dynamically switch the early indication based on the timing and efficiency of processing of the subsystem function as a result of the indication.

In an alternative embodiment, the early indicator 922 comprises a time value that the indication logic 912 uses to determine how early to assert the indication signal. The indication logic 920 periodically or continuously adjusts the early indicator 922 time value to periodically or continuously adjust the timing of the indication signal. Of course, the time value may be set to zero to turn off early indication. In one embodiment, the monitor logic 918 includes logic for determining a time difference between an actual completion time of the subsystem function performed by the subsystem logic 906 and a response time of the processing logic 914. The monitor logic 918 causes the indication logic 920 to adjust the early indicator 922 time value using the determined time difference in an attempt to reduce subsequent time differences to improve efficiency of indication handling and function processing. Alternatively, when the processing logic 914 is executed to perform the subsystem processing, the monitor logic 918 simply determines whether the subsystem logic 906 has completed the associated function. In this latter case, the indication logic 920 adjusts the early indicator 922 time value by an incremental amount so that the time value eventually corresponds to indication latency after several iterations. The incremental method is particularly advantageous as the monitor logic 918 need only determine whether the function is completed and adjust the early indicator 922 accordingly.

In yet another embodiment, timing logic 924 is included which detects the assertion of the indication signal and starts timing or counting. The indication logic 920 of the processing logic 914 reads the time or count value of the timing logic 924 when the processing logic 914 services the subsystem logic 906. In this manner, the processing logic 914 determines the elapsed time or latency of the indication signal. The indication logic 920 resets the timing logic 924 after accessing the timing logic, or the timing logic 924 is automatically reset upon reading it. In either case, the processing logic 914 continuously or periodically monitors the indication latency. The indication latency may be used in any one or more of several manners. The indication logic 920 may use the indication latency to adjust the early indicator if it comprises a timing value. Alternatively, the indication latency may be used for purposes of management, in which case the indication latency is reported. For example, in network embodiments, the indication latency may be reported to the configuration application 402, so that a network administrator may use the information to adjust network parameters or operation of the computer system 102 to improve overall efficiency.

It is now appreciated that a dynamic early indication system according to the present invention improves subsystem processing between a computer subsystem and its host processor by substantially reducing or otherwise eliminating indication or interrupt latency. For network embodiments, the present invention improves network processing between a network adapter or NIC and its host computer by substantially reducing or otherwise eliminating interrupt latency. In the configuration in which the early indicator is an early bit, a predetermined early time offset is used by the subsystem to assert interrupts early, where the early time offset is effectively an estimate of interrupt latency. The early time offset may be a best estimate value, a measured value or a calculated value based on a particular subsystem configuration. The early time offset may be fixed or programmable. In general, the driver is called to service the interrupt closer to when processing is actually needed. For configurations in which the early indicator is a programmable time value, the driver continuously and/or periodically adjusts the time value for more accurate results. The incremental adjust method enables a simple yet very effective design since the time value quickly converges on the interrupt latency, and then is continuously adjusted to closely track the interrupt latency.

A network controller system with dynamic early interrupts according to the present invention is particularly useful on network server systems. Data flow between the network adapter and host computer memory is processed much more quickly, thereby significantly increasing bandwidth and improving network traffic flow.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A dynamic early indication system for a computer, comprising:

a processor;

subsystem logic that performs a subsystem function to be reported to the processor;

an early indicator;

indication logic, coupled to the subsystem logic and to the early indicator, that provides an indication to inform the processor that processing associated with the subsystem function is needed at a completion time of the subsystem function;

the indication logic providing the indication prior to the completion time of the subsystem function if the early indicator indicates early indication;

a driver that is executed by the processor in response to the indication to perform the subsystem processing; and the driver, when executed by the processor, controlling the early indicator in an attempt to improve efficiency of the subsystem processing.

2. The dynamic early indication system of claim 1 further comprising:

a memory coupled to the processor; and the subsystem function associated with transferring data and storing the data in the memory.

3. The dynamic early indication system of claim 2 further comprising:

the completion time corresponding to when the data has been completely stored in the memory.

4. The dynamic early indication system of claim 3 further comprising:

the indication logic calculating the completion time using data transfer rate and an amount of data and calculating an early time using the calculated completion time and a predetermined early time offset; and the indication logic providing the indication at the early time if the early indicator indicates early indication.

5. The dynamic early indication system of claim 1 further comprising:

the early indicator comprising an early logic bit that indicates early indication when set.

6. The dynamic early indication system of claim 5, wherein the computer is coupled to a network, further comprising:

the subsystem logic comprising network logic;

the driver including monitoring logic that monitors traffic on the network; and the driver setting the early logic bit during relatively low network traffic and clearing the early logic bit during relatively high network traffic.

7. The dynamic early indication system of claim 1 further comprising:

the early indicator comprising a programmable early time offset; and the indication logic estimating the completion time and providing the indication at a time based on the estimated completion time and the early time offset.

8. The dynamic early indication system of claim 7 wherein the indication logic provides the indication at an early time based on the difference between the estimated completion time and the early time offset.

9. The dynamic early indication system of claim 7 further comprising:

the driver determining a difference time between an actual completion time of the subsystem function and a response time of the driver and accordingly adjusting the early time offset in an attempt to reduce subsequent difference times.

10. The dynamic early indication system of claim 7, further comprising:

the driver determining whether the subsystem function has completed; and the driver adjusting the early time offset by an incremental amount in an attempt to reduce subsequent difference times.

11. The dynamic early indication system of claim 1 further comprising:

a timer that is initiated when the indication is provided; and the driver reading the timer when executed in response to the indication.

12. The dynamic early indication system of claim 11 further comprising:

the early indicator comprising a programmable early time offset;

the indication logic estimating the completion time and providing the indication at a time based on the estimated completion time and the early time offset; and the driver adjusting the early time offset using a timing value read from the timer.

13. A computer system, comprising:

at least one peripheral bus;

a disk drive and corresponding disk drive controller coupled to the at least one peripheral bus;

a processor coupled to the at least one peripheral bus;

a system memory coupled to at least one peripheral bus and the processor;

an expansion card coupled to the at least one peripheral bus, comprising:

subsystem logic that performs a predetermined function;

an early indicator that indicates an early interrupt mode of operation; and interrupt logic, coupled to the subsystem logic and to the early indicator, that asserts an interrupt to inform the processor that subsystem processing associated with the predetermined function is needed at a completion time of the predetermined function;

the interrupt logic providing the interrupt prior to the completion time of the predetermined function if the early indicator indicates the early interrupt mode; and a subsystem driver that is executed by the processor from the system memory in response to the interrupt to perform the subsystem processing associated with the predetermined function;

the subsystem driver, when executed by the processor, controlling the early indicator in an attempt to improve efficiency of subsequent processing associated with the predetermined function.

14. The computer system of claim 13, wherein the expansion card comprises a network interface card (NIC) for coupling the computer system to a network, wherein the subsystem logic comprises network logic that performs a network function, wherein the interrupt comprises a network interrupt to inform the processor that network processing associated with the network function is needed at a completion time of the network function, and wherein the subsystem driver comprises a NIC driver.

15. The computer system of claim 14, wherein the completion time corresponds to when a group of data from the network is completely transferred to and stored in the system memory.

16. The computer system of claim 14, the interrupt logic further comprising:
   timing logic that calculates the completion time based on data transfer rate from the NIC to the system memory and an amount of data to be transferred and that calculates an early interrupt time using the calculated completion time and a predetermined early time offset; and
   the interrupt logic asserting the network interrupt at the early interrupt time if the early indicator indicates the early interrupt mode.

17. The computer system of claim 14, further comprising:
   the early indicator comprising an early logic bit that indicates the early interrupt mode when set;
   the NIC driver including monitor logic that monitors network traffic; and
   the NIC driver setting the early logic bit during relatively low network traffic and clearing the early logic bit during relatively high network traffic.

18. The computer system of claim 13, further comprising:
   the early indicator comprising an early logic bit that indicates the early interrupt mode when set;
   the subsystem logic performing a predetermined function associated with data communication;
   the subsystem driver including monitor logic that monitors data communication of the subsystem logic; and
   the subsystem driver setting the early logic bit during relatively low communication traffic and clearing the early logic bit during relatively high communication traffic.

19. The computer system of claim 13, further comprising:
   the early indicator comprising a programmable early time offset;
   the interrupt logic including timing logic that calculates a completion time and that determines an early interrupt time based on the difference between the calculated completion time and the early time offset; and
   the interrupt logic asserting the interrupt at the determined early interrupt time.

20. The computer system of claim 19, further comprising:
   the subsystem driver including timing logic that determines a difference time between an actual completion time of the predetermined function and a response time of the subsystem driver when executed by the processor; and
   the subsystem driver including interrupt logic, coupled to the subsystem driver timing logic, that adjusts the early time offset in an attempt to reduce subsequent difference times.

21. The computer system of claim 19, further comprising:
   the subsystem driver determining whether the predetermined function has completed; and
   the subsystem driver interrupt logic adjusting the early time offset by a predetermined incremental amount.

22. The computer system of claim 13, further comprising:
   the expansion card including a counter that is started when the interrupt is asserted; and
   the subsystem driver including interrupt logic that reads a count value from the counter of the expansion card when executed in response to the interrupt.

23. The computer system of claim 22, further comprising:
   the early indicator comprising a programmable early time offset;
   the interrupt logic of the expansion card including timing logic that estimates the completion time;
   the interrupt logic of the expansion card asserting the interrupt at a time using the estimated completion time and the early time offset; and
   the subsystem driver adjusting the early time offset using the count value.

24. A network controller system for a computer coupled to a network comprising:
   means for processing;
   means for performing a network function;
   early indicator means;
   indication means, coupled to the network function performing means and to the early indicator means, for providing an indication to inform the processing means that network processing associated with the network function is needed at a completion time of the network function;
   the indication means providing the indication prior to the completion time of the network function if the early indicator means indicates early indication; and
   the processing means performing the network processing associated with the network function in response to the indication and controlling the early indicator means in an attempt to improve efficiency of the network processing.

25. The network controller system of claim 24 further comprising:
   means for storing data;
   the network function comprising transferring data from the network and storing the data in the storing data means;
   the completion time corresponding to when a group of data has been completely stored in the storing data means;
   the indication means including means for calculating the completion time based on a data transfer rate and an amount of data and for calculating an early time based on the calculated completion time and a predetermined early time offset; and
   the indication means providing the indication at the early time if the early indicator means indicates early indication.

26. The network controller system of claim 24 further comprising:
   the early indicator means comprising an early logic bit than indicates early indication when set; and
   the processing means including means for monitoring network traffic and further including means for setting the early logic bit during relatively low network traffic and clea ring the early logic bit during relatively high network traffic.

27. The network controller system of claim 24 further comprising:
   the early indicator means comprising a programmable early time offset;
   the indication means including means for estimating the completion time and for providing the indication at a time based on the estimated completion time and the early time offset; and
   the processing means including means for determining a difference time between an actual completion time of the network function and a response time of the processing means; and
   the processing means including means for adjusting the early time offset which adjusts the early time offset in an attempt to reduce subsequent difference times.

28. The network controller system of claim 24, further comprising:
the early indicator means comprising a programmable early time offset;
the indication means including means for estimating the completion time and for providing the indication at a time based on the estimated completion time and the early time offset; and
the processing means, when performing the network processing, determining whether the network function has completed; and
the processing means including means for adjusting the early time offset by an incremental amount in an attempt to reduce subsequent difference times.

29. The network controller system of claim 24 further comprising:
means for timing that is initiated when the indication is provided; and
the processing means including means for retrieving a timing value from the timing means in response to the indication.

30. A computer system, comprising:
at least one peripheral bus;
a disk drive and corresponding disk drive controller coupled to the at least one peripheral bus;
means for processing coupled to the at least one peripheral bus;
an expansion card, coupled to the at least one peripheral bus, comprising:
means for performing a subsystem function;
means for indicating an early interrupt mode of operation; and
interrupt means, coupled to the subsystem function performing means and to the indicating means, for asserting an interrupt to inform the processing means that processing associated with the subsystem function is needed;
the interrupt means providing the interrupt before the subsystem function is completed if the indicating means indicates the early interrupt mode;
the processing means performing the processing associated with the subsystem function in response to the interrupt; and
the processing means including means for controlling the indicating means in an attempt to improve efficiency of subsequent processing associated with the subsystem function.

31. The computer system of claim 30, further comprising:
means for storing data coupled to at least one peripheral bus and the processing means;
the subsystem function comprising transferring a group of data to the storing data means; the interrupt means further comprising:
means for estimating a completion time for when the group of data is completely transferred to the storing data means based on a data transfer rate and a size of the group of data; and
means, coupled to the estimating means, for calculating an early interrupt time using the estimated completion time and a predetermined early time offset; and
the interrupt means asserting the interrupt at the early interrupt time if the indicating means indicates the early interrupt mode.

32. The computer system of claim 30, further comprising:
the subsystem function of the expansion card associated with data communication;
the indicating means comprising an early logic bit that indicates the early interrupt mode when set; and
the driver means including means for monitoring communication of the expansion card; and
the controlling means setting the early logic bit during relatively low communication data flow and for clearing the early logic bit during relatively high communication data flow.

33. The computer system of claim 30, the computer system coupled to a network, further comprising:
the indicating means comprising an early logic bit that indicates the early interrupt mode when set; and
the driver means including means for monitoring traffic of the network; and
the controlling means setting the early logic bit during relatively low network traffic and for clearing the early logic bit during relatively high network traffic.

34. The computer system of claim 30, further comprising:
the indicating means comprising a programmable early time offset;
the interrupt means including means for estimating a completion time of the subsystem function;
the interrupt means including means for determining an early interrupt time using the estimated completion time and the early time offset; and
the interrupt means asserting the interrupt at the determined early interrupt time.

35. The computer system of claim 34, further comprising:
the processing means including means for determining a time difference between when the subsystem function is actually completed and a time when the processing means responds to the interrupt; and
the controlling means adjusting the early time offset using the determined time difference.

36. The computer system of claim 34 further comprising:
the processing means including means for determining whether the subsystem function has completed when the processing means performs the processing associated with the subsystem function; and
the controlling means adjusting the early time offset by an incremental amount.

37. The computer system of claim 30, further comprising:
means for timing that is initiated when the interrupt is provided; and
the processing means including means for retrieving a timing value from the timing means when responding to the interrupt.

38. A method of providing dynamic early indications for a subsystem of a computer, the method comprising:
providing an early value indicative of whether an early indication mode of operation is in effect;
initiating a subsystem function;
providing an indication to request processing associated with the subsystem function, the indication being provided before the subsystem function is completed if the early value indicates the early indication mode;
executing a driver to perform subsystem processing associated with the subsystem function in response to the indication; and
controlling, by the executing driver, the early value in an attempt to improve efficiency of processing associated with the subsystem function.

39. The method of claim 38 wherein the subsystem function comprises transferring data to a memory of the computer.

40. The method of claim 39 further comprising:

calculating an estimated completion time of when data is completely transferred to the memory;

calculating an early time using the estimated completion time and a predetermined early time offset; and providing the indication at the early time if the early value indicates the early indication.

41. The method of claim 38, wherein the subsystem function is associated with data communication and wherein the early value comprises an early logic bit that indicates early indication when set, further comprising:

monitoring communication data flow;

the controlling comprising setting the early logic bit during relatively low data flow; and the controlling further comprising clearing the early logic bit during relatively high data flow.

42. The method of claim 38, wherein the computer is coupled to a network and wherein the early value comprises an early logic bit that indicates early indication when set, further comprising:

monitoring traffic on the network;

the controlling comprising setting the early logic bit during relatively low network traffic; and the controlling further comprising clearing the early logic bit during relatively high network traffic.

43. The method of claim 38, the early value comprising a programmable early time offset, further comprising:

calculating an estimated completion time of the subsystem function; and providing the indication before the subsystem function is completed using the estimated completion time and the early time offset.

44. The method of claim 43 further comprising:

determining a difference time between an actual completion time of the subsystem function and when the driver is executed to perform the processing associated with the subsystem function; and the controlling comprising adjusting the early time offset in an attempt to reduce subsequent difference times.

45. The method of claim 43 further comprising:

determining whether the subsystem function has completed when the driver is executed to perform the subsystem processing; and the controlling comprising adjusting the early time offset by an incremental amount.

46. The method of claim 45 further comprising:

the adjusting comprising decreasing the early time offset by the incremental amount if the subsystem function has completed; and the adjusting comprising increasing the early time offset by the incremental amount if the subsystem function has not completed.

47. The method of claim 38 further comprising:

starting a counter when the indication is provided; and reading, by the executing driver, a count value from the counter when the driver is executed in response to the indication.

48. The method of claim 47, the early value comprising a programmable early time offset, further comprising:

determining an estimated completion time of the subsystem function;

providing the indication before the estimated completion time by an amount of time corresponding to the early time offset; and the controlling comprising adjusting the early time offset using the count value.

* * * * *